Sept. 17, 1968　　　　　A. R. SASS　　　　　3,402,400
NONDESTRUCTIVE READOUT OF CRYOELECTRIC MEMORIES
Filed Nov. 22, 1965　　　　　　　　　　2 Sheets-Sheet 1
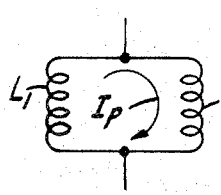
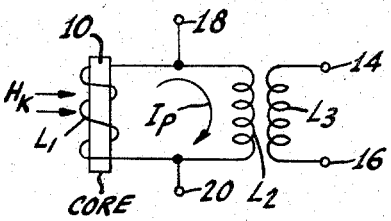
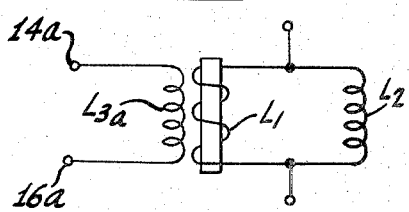
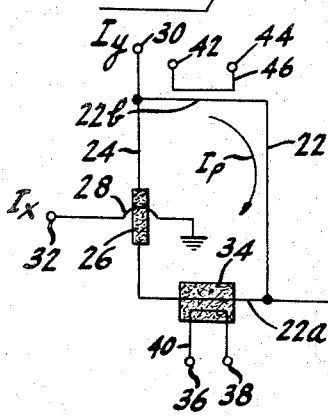
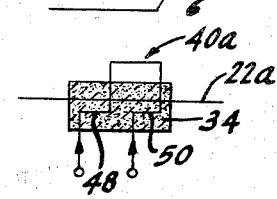
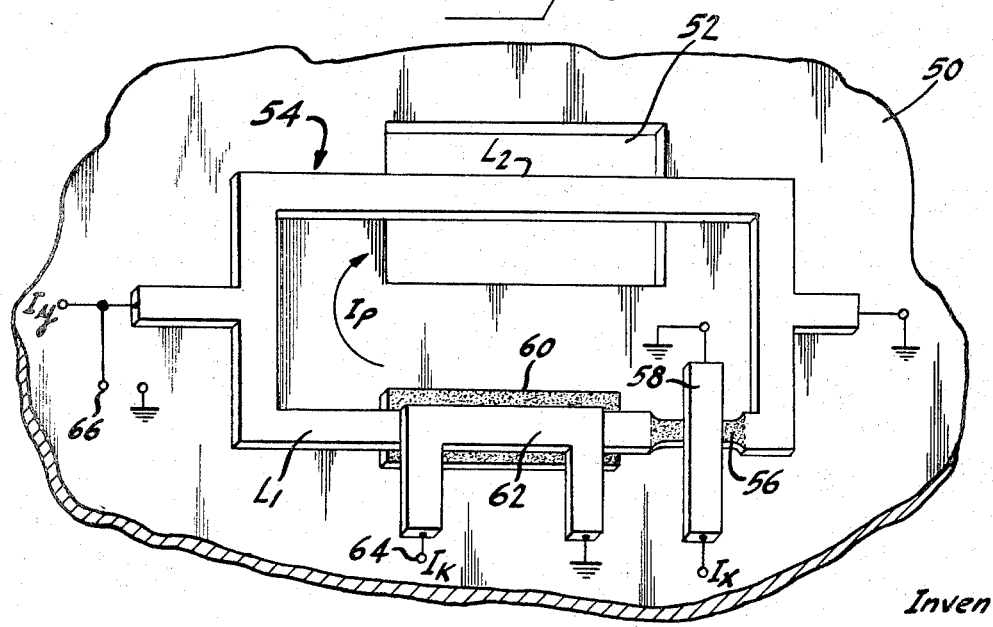
Inventor:
ANDREW R. SASS
BY
Attorney

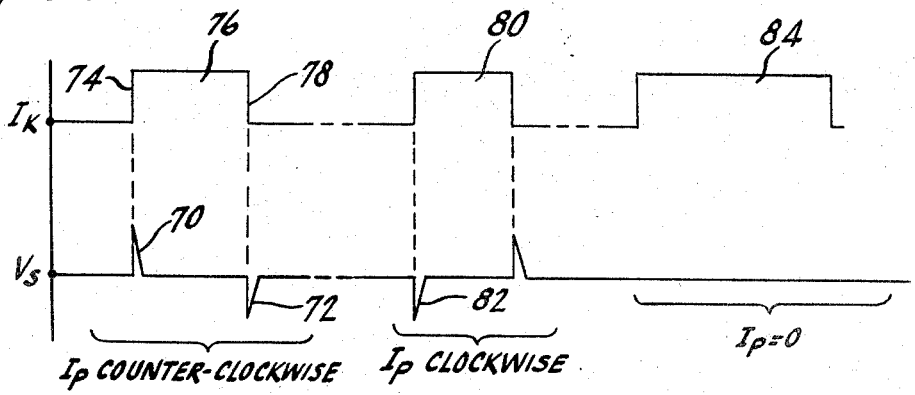
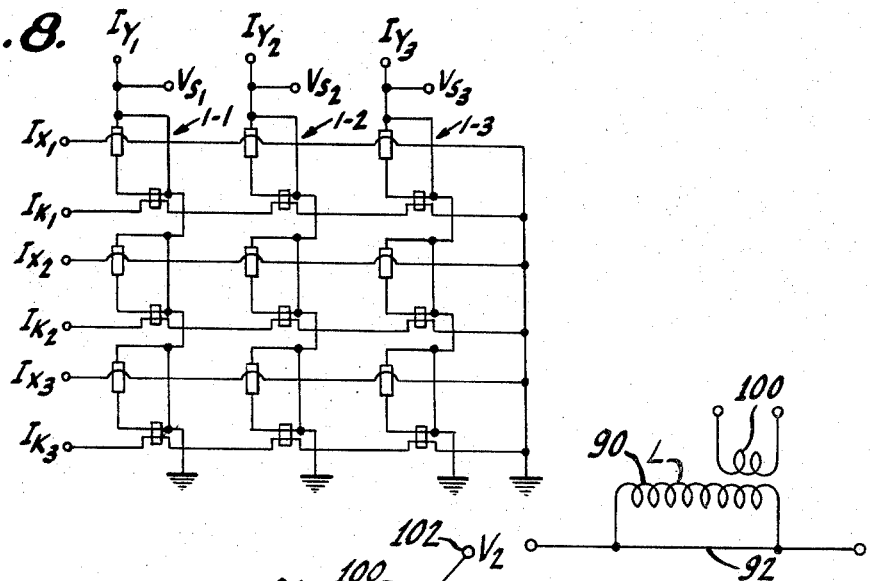
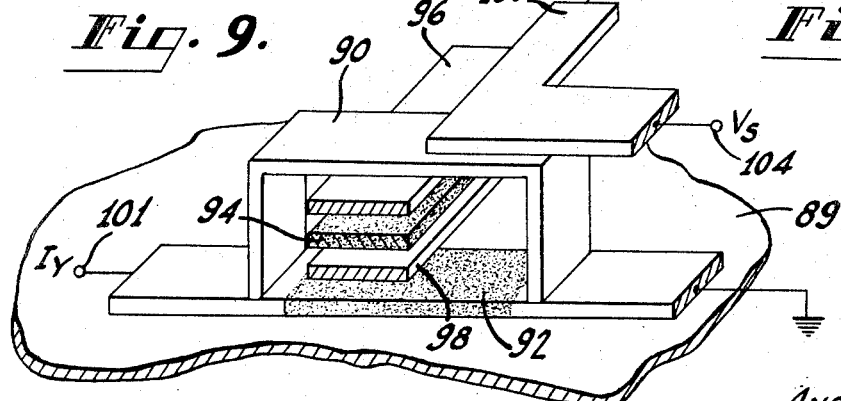

United States Patent Office 3,402,400
Patented Sept. 17, 1968

3,402,400
NONDESTRUCTIVE READOUT OF
CRYOELECTRIC MEMORIES
Andrew R. Sass, Princeton, N.J., assignor to Radio Corporation of America, a corporation of Delaware
Filed Nov. 22, 1965, Ser. No. 509,054
8 Claims. (Cl. 340—173.1)

ABSTRACT OF THE DISCLOSURE

A superconducting storage loop which stores persistent current is non-destructively read out by changing the inductance of the loop without affecting the superconducting state of the loop and sensing for the resulting change in persistent current flow through the loop.

---

This invention relates to the non-destructive readout of cryoelectric memories which store information as persistent currents.

The memory of the invention includes a superconductor loop storing a persistent current. A superconductor element is located adjacent to said loop and means are provided for driving this element between superconducting and normal states and thereby changing the inductance of the loop. This change in inductance causes a corresponding change in the magnitude of the persistent current flowing through the loop. The change in current may, in turn, be sensed as a voltage $$L\frac{dI}{dt}$$

where $L$ is the inductance of a portion of the loop and $dI/dt$ is the change in current during a given interval of time.

The invention is discussed in greater detail below and is shown in the following drawings of which:

FIGURES 1–3 are equivalent circuits to explain the operation of the present invention;

FIGURE 4 is a schematic drawing of one type of persistent current memory cell according to the invention;

FIGURE 5 is a schematic drawing of a preferred winding configuration for the cell of FIGURE 4;

FIGURE 6 is a more realistic, perspective showing of a memory cell according to the invention;

FIGURE 7 is a drawing of waveforms obtained during the readout of the cell of FIGURE 6 under different storage conditons;

FIGURE 8 is a schematic drawing of a word-organized memory according to the invention;

FIGURE 9 is a perspective view of a so-called "bridge" cell according to the invention; and FIGURE 10 is an equivalent circuit of certain portions of the cell of FIGURE 9.

In the discussion which follows, a low temperature environment, such as one at a few degrees Kelvin, at which superconductivity is possible, is assumed. Means for achieving such temperatures are well-known and need not be discussed here.

FIGURE 1 is an equivalent circuit of any cryoelectric, persistent current memory cell. The cell may take any one of a number of different forms and persistent current may be induced in the cell in one of a number of different ways. Specific structures are discussed in greater detail later.

The memory cell of FIGURE 1 may be thought of as consisting of two inductances $L_1$ and $L_2$. A persistent current $I_p$ continuously circulates around the loop. Circulation of the current in one direction may represent storage of the binary digit (bit) 1 and circulation of the current around the loop in the opposite direction may represent storage of the bit 0. Alternatively, the presence of the circulating current in a given direction may represent storage of a bit of one value and the absence of circulating current may represent storage of the bit of other value.

An equivalent circuit of one form of memory cell according to the invention appears in FIGURE 2. It includes all of the elements of the circuit of FIGURE 1 and, in addition, a "core" 10. The core 10 is formed of a relatively "soft" superconductor material such as tin or the like and the loops $L_1$ and $L_2$ may be formed of a relatively hard superconductor material such as lead. A secondary winding $L_3$ may be coupled to winding $L_2$.

In the operation of the memory cell of FIGURE 2, the memory cell is non-destructively read out by driving the core 10 between superconducting and normal states. The means for doing this may be means (other than $L_1$) for applying a magnetic field of magnitude $H_k$ to the core, where $H_k$ is greater than $H_c$, the critical magnetic field for the core 10. The driving of the core between normal and superconducting states results in a change in the amount of persistent current which flows in the loop and this in turn causes a voltage to develop at output terminals 14, 16 of the secondary winding $L_3$. Why this occurs may be understood from the brief mathematical treatment which follows: Let $L_s$ = the inductance of coil $L_1$ when the core 10 is in the superconducting state.
$L_n$ = the inductance of coil $L_1$ when the core 10 is in the normal state.
$I_s$ = the persistent current which flows when $L_1 = L_s$.
$I_n$ = the persistent current which flows when $L_1 = L_n$.

As is well understood in this art, when a diamagnetic material, such as a superconductor in the superconducting state, is placed next to a current carrying conductor, the inductance exhibited by the conductor is relatively low. When the diamagnetic material is removed, the inductance exhibited by the conductor increases. Accordingly, when the core 10 is in the superconducting state, the inductance exhibited by coil $L_1$ is relatively low. When the core 10 is in the normal state, the inductance exhibited by the coil $L_1$ is relatively high. In other words $$L_s < L_n \tag{1}$$

The total flux stored in the persistent current loop of FIGURE 2 is $$I(L_1 + L_2) \tag{2}$$

In any superconductor memory element which stores information as a persistent current, the total stored flux must remain constant. Therefore, when, as a result of the change in condition of core 10, the inductance $L_1$ changes, there must be a compensating change in the amount of persistent current which flows in order to maintain the total flux constant. In mathematical terms, $$I_s(L_s + L_2) = I_n(L_n + L_2) \tag{3}$$

$$\frac{I_s}{I_n} = \frac{L_n + L_2}{L_s + L_2} \tag{3a}$$

Since $L_n$ is greater than $L_s$, then $I_s$ is greater than $I_n$.

The voltage $V$ which develops across the coil $L_2$ when the persistent current changes from value $I_n$ to $I_s$ is $$V = L_2 \frac{dI}{dt} \tag{4}$$

where $dI = I_s - I_n$ and $dt$ is the time required for the change in current $dI$ to take place.

The change in current flow through coil $L_2$ may be detected as a voltage across the secondary winding $L_3$. This voltage may be picked up at terminals 14, 16. As an alternative, the voltage V which develops across winding $L_2$ may instead be sensed directly across the loop at terminals 18, 20. As a third alternative, the sense voltage may be picked up across a secondary winding $L_{3a}$ which is coupled to winding $L_1$. The voltage, in this case, is available at terminals 14a, 16a, as shown in FIGURE 3.

From Equation 4 above, it is clear that V is maximized when $L_2$ is relatively large and when $dI$ is relatively large compared to $dt$. One way in which $dt$ may be minimized is to make the core thickness relatively small, as the time T required for a superconductor element to switch is proportional to the square of the thickness of the element. For example, a thin film may be employed for the core. $dI$ can be increased by employing for the core a plurality of thin films which are insulated from one another by thin insulator films. In this case, $dt$ still remains relatively small but the change in current $dI$ which increases substantially in view of the larger volume occupied by the core.

In the non-destructive readout arrangement of the invention, the stored current $I_p$ is not dissipated, as the total flux in the loop remains constant. The energy required to cause the flux to "shuttle" from one portion of the loop to the other is the energy which is supplied to switch the core from the superconducting to the normal state and is provided by the external source which produces the magnetic field $H_k$. This external source also supplies the energy needed for detection of the non-destructive readout voltage which develops. (The physical detector requires a certain amount of power to perform detection.)

A schematic drawing of a practical form of persistent current storage element, known as a "persistatron," appears in FIGURE 4. The conventional element includes the loop 22, 24 and the gate element 26 of a cryotron in series with the portion 24 of the loop. The control element 28 of the cryotron is magnetically coupled to the gate element 26.

In the operation of the conventional persistatron, coincident currents $I_y$ and $I_x$ are initially applied to terminals 30 and 32, respectively. The magnetic field due to the current $I_x$ is of sufficient magnitude to drive the gate element 26 normal, when that gate element is carrying the current $I_y$. When the gate element 26 is driven normal, the current $I_y$ steers into the loop portion 22. Thereafter, the current $I_x$ is terminated and then the current $I_y$ is terminated, whereupon a persistent current $I_p$ remains stored. This persistent current may be destructively read out by driving the gate 26 normal. In this case, the persistent current, as it dies out, causes a voltage to develop across the finite resistance exhibited by the gate 26. This voltage appears at terminal 30.

In the arrangement of the present invention, a soft superconductor core 34 is located adjacent to the loop portion 22a. The loop portion 22a is formed of hard superconductor material. Non-destructive readout is achieved by applying a read current to terminals 36, 38 of the winding 40. The read current produces a magnetic field of sufficient magnitude to drive the core 34 from its superconducting to its normal state, but of insufficient magnitude to affect the state of the loop portion 22a. When the core 34 is driven normal, the inductance exhibited by the loop portion 22a increases and the amount of persistent current which flows decreases. This decrease in current flow may be detected as a change in voltage at terminals 42, 44 of the sense winding 46 as this sense winding is coupled to the portion 22b of the loop. As an alternative, the sense winding 46 may be dispensed with and the change in persistent current flow detected as a change in voltage at terminal 30.

It is preferred in the arrangement of FIGURE 4 to so arrange the winding 40 that it couples a minimum amount of magnetic field to the loop 22a and a maximum amount of the field to the core 34. One way this may be achieved is shown in FIGURE 5. Note that the in-line portions 48 and 50 of the drive winding 40a induces magnetic fields of opposite directions in the loop portion 22a. However, overall, the magnetic fields produced by the winding 40a are additive at the core 34.

FIGURE 6 is a more realistic showing of a persistatron constructed in accordance with the present invention. It is to be understood that there is insulation present between the various layers of superconductor material which are shown. This insulation is omitted from the drawing so that the parts more easily may be viewed.

The memory element of FIGURE 6 includes a superconductor ground plane 50 of hard superconductor material such as lead formed with an aperture 52 therein. A loop 54 is insulated from and positioned on this ground plane. The loop consists of two legs $L_2$ and $L_1$, leg $L_2$ lying over the aperture 52. For the major portion of its extent, the loop 54 is formed of a hard superconductor material such as lead. However, the relatively small region 56 of leg $L_1$ is formed of a soft superconductor material such as tin and is the gate element of a cryotron. The control element 58 of the cryotron is insulated from and lies over the gate element 56.

A core 60 formed of a soft superconductor material such as tin is insulated from and lies between the portion $L_1$ of the loop and the superconductor ground plane 50. Preferably this core consists of a number of thin films which lie over and are insulated from one another. The drive wniding 62 is insulated from and lies over the portion $L_1$ of the loop. White not shown, it is to be understood that this drive winding may have the configuration of the winding of FIGURE 5. As a third alternative, the winding 62, rather than being an in-line structure as shown, may be a "crossed-film" structure (one at right angles to $L_1$), arranged similarly to the control element 58 of the cryotron.

The operation of the arrangement of FIGURE 6 is quite similar to that of the arrangement of FIGURE 4. Information may be written into the loop 54 by the concurrent application of currents $I_x$ and $I_y$. These currents are of sufficient magnitude to drive the gate 56 normal. After this occurs, the current $I_x$ is removed and then the current $I_y$, a persistent current, remains stored in the loop. The memory elements may be non-destructively read out by applying current $I_k$ to terminal 64. This current has a magnitude sufficient to drive the core 60 normal but insufficient to affect the state of the leg $L_1$ of loop 54. The sense voltage which develops in response to the current $I_k$ may be read out between terminal 66 and ground.

Waveforms depicting the operation of the circuit of FIGURE 6, under different conditions, appear in FIGURE 7. When the circulating current is counterclockwise, the read current $I_k$ which is applied, causes a sense voltage to develop as shown at 70 and 72. The core 60 is driven to the normal state in response to the leading edge 74 of the pulse 76. This causes an increase in the current flowing through the leg $L_2$ and the sense of the current flow is such that a positive sense voltage pulse 70 appears between terminal 66 and ground. In a corresponding manner, in response to the trailing edge 78 of the pulse 76, the core 60 returns to its superconducting state and a negative sense voltage appears between terminal 66 and ground.

When the loop 54 is storing a clockwise persistent current and a read pulse 80 is applied to terminal 64, the sense voltage which is produced is a negative pulse 82 followed by a positive pulse 84. As in the previous example, the first occurring pulse 82 is formed in response to the leading edge of the read pulse 80 and the second pulse 84 is formed in response to the lagging edge of the pulse 80.

If the loop 54 is storing no current, the the read pulse 84 is applied to terminal 64 results in no sense voltage between terminal 66 and ground.

The purpose of the hole 52 in the trrangement of FIGURE 6 is to substantially increase the inductance of the portion $L_2$ of the loop 54. The hole is made sufficiently large so that $L_2$ is substantially greater than $L_1$. Making $I_2$ relatively large, increases the value of the sense voltage, as should be clear from Equation 4 above. However, it can be shown by rearrangement and simplification of the terms of Equation 3a, that increase of the value of $L_2$ beyond a given value results in no further significant increase in the sense voltage.

A 3×3 word-organized memory according to the invention is shown in FIGURE 8. The cells of the memory are persistatrons such as shown in FIGURE 6 or FIGURE 4. Information may be written into a row of the memory by applying a current $I_x$ concurrently with currents $I_y$. For example, to store 101 in row 1 of the memory, a current $I_{x_1}$ in a given direction may be applied to the cemory with currents $I_y$ and $I_{y_2}$ in one direction and $I_{y_3}$ in the opposite direction. Thereafter, first current $I_x$ is removed then the currents $I_y$ are removed. Persistent currents in one direction then circulate in loops 1—1 and 1–3 and a persistent current in the opposite direction circulates in loop 1–2. Row 1 of the memory may be non-destructively read out by applying the current $I_{k_1}$ and observing the polarity (positive followed by negative or vice versa) of the three sense voltages $V_{s1}$, $V_{s2}$ and $V_{s_2}$, respectively, which are produced.

Another embodiment of the invention, this one a so-called "bridge cell" is shown in FIGURE 9. A general discussion of various types of bridge cells may be found in copending application Ser. No. 408,009, entitled, Memories, filed Nov. 2, 1964, by R. W. Ahrons and assigned to the same assignee as the present invention.

The bridge cell of FIGURE 9 includes a ground plane 89 and two parallel current paths insulated from the ground plane. The first path 90 is formed of a hard superconductor such as lead and the second path 92 is formed of a soft superconductor such as tin. A circulating current is established around the loop 90, 92 by applying a current $I_y$ and concurrently driving the soft superconductor 92 to its normal condition. Thereafter, the path 92 is permitted to return to the superconducting state and he current $I_y$ is removed. A persistent current then remains circulating around the loop 90, 92.

According to the present invention, a core 94 formed of a soft superconductor material passes between the paths 90, 92. This core may be a plurality of thin films which are insulated from one another all formed of a soft superconductor material, or a single film. Drive leads 96, 98 formed of a hard superconductor material are located one on each side of the core 94. The drive leads and core are insulated from one another and from the paths 90, 92. A sense winding 100 is located over a portion of the path 90 and is insulated therefrom.

Information may be read into the bridge cell of FIGURE 9 by applying currents $I_{y_1}$ and $I_{y_2}$ concurrently to drive leads 96 and 98, respectively, and current $I_y$ to terminal 101. The currents applied to leads 96 and 98 are applied in the same direction so that the magnetic fields due to these currents add at the path 92 but cancel in the region of core 94. The magnetic field which results is sufficient to drive the path 92 to its normal state when that path is carrying the current $I_y$. Thereafter, current is removed from leads 96, 98 and then the currents $I_y$ are removed. A persistent current thereupon circulates in the loop 90, 92.

Non-destructive readout is achieved in the memory of FIGURE 9 by applying read currents $I_{y_1}$ and $I_{y_2}$ to the leads 96, 98. However, these read currents are now applied in opposite directions so that the magnetic fields which result are additive in the region of core 94 and cancel in the regions of paths 92 and 90. These magnetic fields are of sufficient magnitude, taken together, to drive the core 94 normal but do not affect the state either of paths 90 or 92. This changes the flux distribution along the path 90. The sense winding 100 is coupled to a portion of this path and, in response to this change in flux distribution, produces a sense voltage across terminals 102, 104.

The operation above may be better understood by consideration of the equivalent circuit of FIGURE 10. In practice, as explained in the copending application above, the layers 90 and 92 are thin films. The elements 96, 94, 98 of the present structure are also thin films. All of these thin films are separated from one another by thin insulating films. Accordingly, there is a very large amount of mutual coupling between the paths 90 and 92. In terms of an equivalent circuit, the path 90 may be considered as including the major portion of the inductance of the loop and the path 92 a relatively small portion of the inductance of the loop. Accordingly, the latter portion is shown to have no inductance in FIGURE 10.

When the core 94 is driven to the normal state, the total flux present in the loop 90, 92 does not change. However, as the inductance of a portion of the loop must decrease causing a decrease in the amount of persistent current, the flux in the remainder of the loop must increase to maintain the total amount of flux constant. This increase in flux causes a voltage to develop across the sense winding 100 as it is coupled only to a portion of the path 90. (If the sense winding 100 were, in fact, coupled to the entire path 90, no sense voltage would develop since as mentioned above, the total flux in the loop 90, 92 does not change. In other words, in this situation, the change in the mutual inductance between 90 and 100 exactly cancels the effect of the change of loop 90, 92 inductance.)

What is claimed is:
1. In combination:
   a superconducting loop storing a persistent current;
   a superconductor element located adjacent to said loop;
   means for driving said element between superconducting and normal states and thereby changing the inductance of the loop; and
   means for sensing the change in the amount of persistent current which flows as a result of said change in inductance.

2. The invention set forth in claim 1 wherein the means for driving the superconductor element between superconducting and normal states comprises means for applying a magnetic field to the element.

3. The invention set forth in claim 1 further including a superconductor ground plane, said loop being located on and insulated from the ground plane and lying in a plane parallel to the ground plane.

4. The invention set forth in claim 1, further including a superconductor ground plane, said loop being located on and insulated from the ground plane and extending in a direction perpendicular to the ground plane.

5. In combination:
   a superconducting loop formed largely of relatively hard superconductor material;
   means for establishing a persistent current in said loop including means for driving a portion of the loop to the normal state and then permitting that portion of the loop to return to the superconducting state;
   a superconducting element formed of a relatively soft superconductor material located adjacent to and insulated from a portion of said loop formed of hard superconductor material;
   means for applying a magnetic field to said element of sufficient magnitude to drive said element between superconducting and normal states and thereby to change the inductance of a portion of said loop but of insufficient magnitude to affect the superconducting state of said loop; and
   means at which a voltage is produced in response to the change in the amount of persistent current which flows as a result of the change in inductance.

6. The combination of claim 5 in which the last-named means comprises a sense winding which is coupled solely to a portion of the loop at which a change in flux occurs as a result of the change in persistent current flow.

7. The combination of claim 5 in which the means for applying a magnetic field comprises means for applying fields in opposite senses to the loop and in the same sense to the superconducting element.

8. The combination of claim 5 in which the last-named means comprises a pair of output terminals connected across said loop.

References Cited

UNITED STATES PATENTS

| | | | |
|---|---|---|---|
| 2,913,881 | 11/1959 | Garwin | 340—173.1 X |
| 2,946,030 | 7/1960 | Slade | 340—173.1 X |
| 3,196,408 | 7/1965 | Brennemann et al. | 340—173.1 |
| 3,222,544 | 12/1965 | Cheng | 307—88.5 |
| 3,264,490 | 8/1966 | Gange | 340—173.1 X |
| 3,275,930 | 9/1966 | Cassidy et al. | 340—173.1 X |

BERNARD KONICK, *Primary Examiner.*

J. BREIMAYER, *Assistant Examiner.*